Oct. 28, 1941.    M. CHULICK ET AL    2,260,932
CHRISTMAS TREE HOLDER
Filed Jan. 24, 1940    2 Sheets-Sheet 2
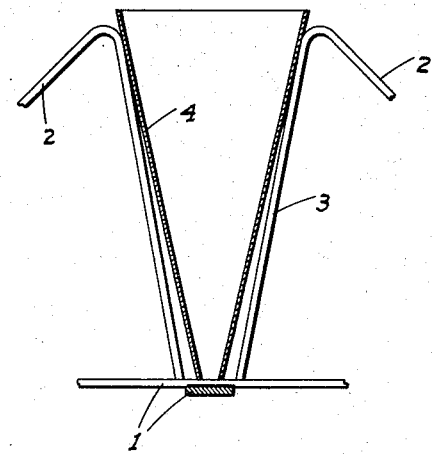
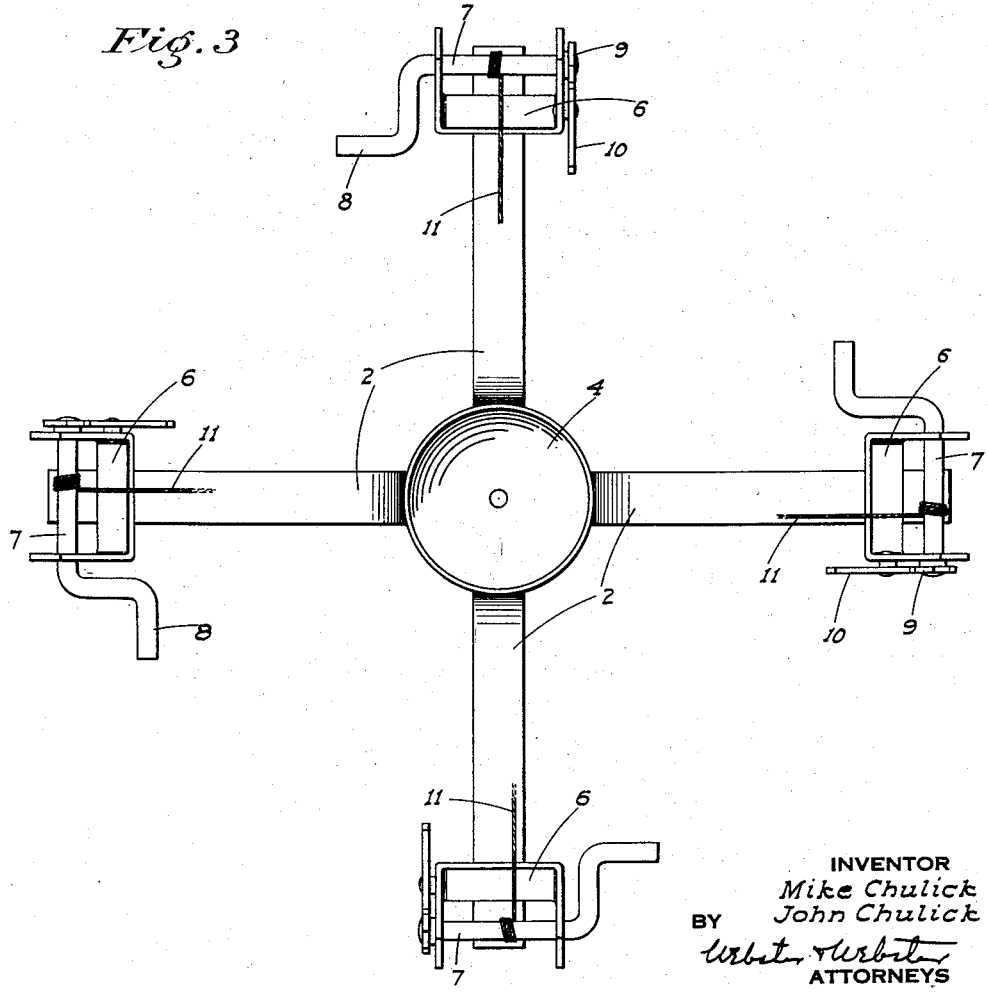
INVENTOR
Mike Chulick
John Chulick
BY
ATTORNEYS Patented Oct. 28, 1941

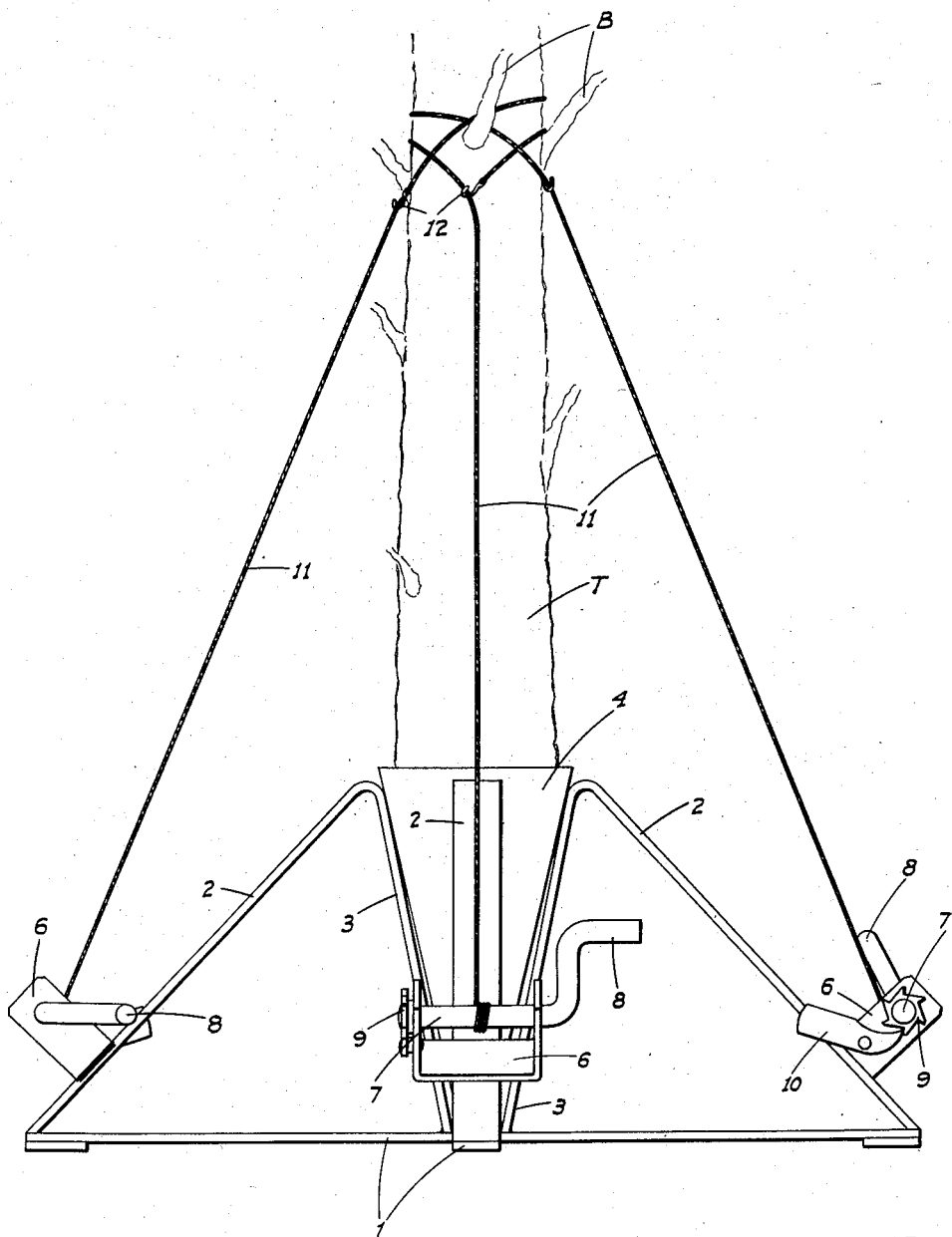

2,260,932

UNITED STATES PATENT OFFICE 2,260,932

CHRISTMAS TREE HOLDER

Mike Chulick and John Chulick, Winters, Calif.

Application January 24, 1940, Serial No. 315,350

2 Claims. (Cl. 248—44)

This invention relates in general to an article supporting stand; and in particular the invention is directed to an improved Christmas tree stand or holder.

The principal object of the invention is to provide a Christmas tree holder adapted to rigidly support a tree; the holder including a locating or centering member for the lower end of the tree trunk, and means to adjust the tree trunk to a vertical position relative to said holder.

Another object of the invention is to provide an improved Christmas tree holder which is sturdy and may be used year after year; the attachment of the device requiring no screws, nails or tools.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a side elevation of the device as in use.

Figure 2 is a fragmentary sectional elevation showing the tapered centering cup.

Figure 3 is a plan view of the device.

Referring now more particularly to the characters of reference on the drawings, the device comprises a pair of rigid base members 1, each being of substantial length and disposed at right angles to and intersecting the other member centrally of its ends.

Other members 2 extend upwardly and inwardly from the outer ends of members 1; these other members being bent downward short of each other at their upper ends. The downwardly bent portions 3 converge and at their lower ends are connected in spaced relation on members 1 at substantially the point of intersection thereof.

A cup or socket 4, open at its upper end and tapering towards its lower end is fixed between portions 3; the upper end of the cup being substantially flush with the upper ends of members 2. The above described portion of the device forms the stand or base, and the several elements thereof are secured together as a unit by any suitable means, such as welding.

A small windlass, indicated generally at 6, is fixed on each member 2 adjacent its lower end; each such windlass including a cable winding shaft 7 adapted to be rotated by a crank 8 formed on one end thereof. The other end of each shaft 7 carries a ratchet wheel 9 cooperatively engaged by a pivoted pawl 10; the pawl being of such length beyond the pivot in a direction away from the ratchet wheel so as to normally gravitationally engage the same.

A relatively long, light weight, flexible cable or guy 11 is secured at one end on each shaft 7, while at the other end the cable is provided with a hook 12.

In use, the lower end of the trunk T of a Christmas tree is seated in taper cup 4 which centers said trunk relative to the base or stand. Each of the cables 11 is then run out substantially full length, looped about the trunk T some distance above the base and immediately above branches B, and hooks 12 engaged with the corresponding cables. Thereafter the windlass cranks 8 are manually actuated so as to rotate shafts 7 in a ratchet overrunning direction and to wind cables 11 about said shafts. By proper manipulation of the windlasses, not only are the cables tensioned but the tree trunk T is secured vertically against lateral movement. As thus supported, the Christmas tree is firmly and vertically held in place on the base or stand.

To release the cables preparatory to removing the tree from the base or stand, pawls 10 are manually withdrawn from ratchet wheels 9, the cables slacked, hooks 12 detached therefrom, and the cables removed from about trunk T.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A Christmas tree holder comprising a base to rest on the floor, a socket upstanding from the base to support and prevent lateral displacement of the butt of the tree and a plurality of individually extensible and flexible guy elements fixed in connection with the base in spaced relation about and radially out from the socket, said elements being adapted to extend upwardly and having means included therewith for individual engagement about the trunk of the tree above the socket.

2. A Christmas tree holder comprising a base to rest on the floor, a socket upstanding from the base to support and prevent lateral displacement of the butt of the tree and a plurality of individually extensible and flexible guy wires mounted in connection with the base in spaced relation about and radially out from the socket, and a wire engaging hook on the upper end of each wire whereby the wire may be passed about the trunk of the tree adjacent and above a branch and the hook then engaged with the depending portion of the wire to form a holding loop about the tree.

MIKE CHULICK.
JOHN CHULICK.